United States Patent
Wong et al.

(10) Patent No.: US 9,539,538 B2
(45) Date of Patent: Jan. 10, 2017

(54) MULTI-FUNCTIONAL COMPOSITION OF MATTER FOR RAPID REMOVAL OF MERCURY FROM A FLUE GAS

(75) Inventors: Joseph M. Wong, Castle Rock, CO (US); Robert B. Huston, Longmont, CO (US); Christopher Vizcaino, Littleton, CO (US); Frederick S. Cannon, State College, PA (US)

(73) Assignee: ADA Carbon Solutions, LLC, Littleton, CO (US)

(*) Notice: Subject to any disclaimer, the term of this patent is extended or adjusted under 35 U.S.C. 154(b) by 870 days.

(21) Appl. No.: 13/587,140

(22) Filed: Aug. 16, 2012

(65) Prior Publication Data
US 2013/0109562 A1  May 2, 2013

Related U.S. Application Data

(60) Provisional application No. 61/553,000, filed on Oct. 28, 2011.

(51) Int. Cl.
*B01D 53/64* (2006.01)
*F23J 15/00* (2006.01)
(Continued)

(52) U.S. Cl.
CPC .......... *B01D 53/64* (2013.01); *B01D 53/8665* (2013.01); *F23J 15/003* (2013.01); *B01D 53/83* (2013.01); *B01D 2253/102* (2013.01); *B01D 2253/106* (2013.01); *B01D 2253/112* (2013.01); *B01D 2253/304* (2013.01); *B01D 2253/308* (2013.01); *B01D 2253/31* (2013.01); *B01D 2253/311* (2013.01); *B01D 2255/2022* (2013.01);
(Continued)

(58) Field of Classification Search
None
See application file for complete search history.

(56) References Cited

U.S. PATENT DOCUMENTS 3,803,803 A * 4/1974 Raduly ................. B01D 53/64
                                                    95/134
3,873,581 A * 3/1975 Fitzpatrick et al. .......... 552/234
(Continued)

FOREIGN PATENT DOCUMENTS

| WO | 2008143831 A2 | 11/2008 |
| WO | 2013063490 A1 | 5/2013 |
| WO | 2013082157 A1 | 6/2013 |

OTHER PUBLICATIONS

International Search Report and Written Opinion in relation to PCT/US2012/62253 (Feb. 25, 2013).
(Continued)

*Primary Examiner* — Melvin C Mayes
*Assistant Examiner* — Sheng H Davis
(74) *Attorney, Agent, or Firm* — Marsh Fischmann & Breyfogle LLP (57) ABSTRACT

A multi-functional composition of matter that is useful for injection into a flue gas stream to rapidly and efficiently remove mercury from the flue gas stream. The multi-functional composition of matter may include a fixed carbon sorbent and minerals, halogens in the form of halide salts, as well as other physical and chemical properties to enhance (1) the oxidation reaction kinetics for the oxidation of mercury species and (2) the mass diffusion kinetics of the mercury species.

26 Claims, 6 Drawing Sheets

(51) Int. Cl.
*B01D 53/86* (2006.01)
*B01D 53/83* (2006.01)

(52) U.S. Cl.
CPC ............... *B01D 2255/2045* (2013.01); *B01D 2255/2047* (2013.01); *B01D 2255/2094* (2013.01); *B01D 2255/20738* (2013.01); *B01D 2255/20792* (2013.01); *B01D 2255/702* (2013.01); *B01D 2255/9202* (2013.01); *B01D 2257/602* (2013.01); *B01D 2258/0283* (2013.01); *F23J 2215/60* (2013.01); *F23J 2219/30* (2013.01)

(56) References Cited

U.S. PATENT DOCUMENTS

| | | | |
|---|---|---|---|
| 4,077,809 A | 3/1978 | Plunguian et al. | |
| 4,642,304 A | 2/1987 | Karl et al. | |
| 4,729,882 A | 3/1988 | Ide et al. | |
| 4,976,848 A | 12/1990 | Johnson | |
| 5,368,754 A | 11/1994 | Von Klock et al. | |
| 5,607,496 A | 3/1997 | Brooks | |
| 5,695,726 A | 12/1997 | Lerner | |
| 5,854,173 A | 12/1998 | Chang et al. | |
| 5,880,061 A | 3/1999 | Yoshino et al. | |
| 5,972,525 A | 10/1999 | Mori et al. | |
| 6,027,551 A | 2/2000 | Hwang et al. | |
| 6,064,560 A * | 5/2000 | Hirahara | C01B 31/12 361/502 |
| 6,150,300 A | 11/2000 | Khare et al. | |
| 6,326,326 B1 | 12/2001 | Feng et al. | |
| 6,514,907 B2 | 2/2003 | Tsutsumi et al. | |
| 6,558,454 B1 | 5/2003 | Chang et al. | |
| 6,582,497 B1 | 6/2003 | Maes et al. | |
| 6,818,043 B1 | 11/2004 | Chang et al. | |
| 6,848,374 B2 | 2/2005 | Srinivasachar et al. | |
| 6,953,494 B2 | 10/2005 | Nelson, Jr. | |
| 7,141,091 B2 | 11/2006 | Chang | |
| 7,361,209 B1 | 4/2008 | Durham et al. | |
| 7,429,330 B2 | 9/2008 | Vo et al. | |
| 7,435,286 B2 | 10/2008 | Olson et al. | |
| 7,479,263 B2 | 1/2009 | Chang et al. | |
| 7,514,052 B2 | 4/2009 | Lissianski et al. | |
| 7,572,421 B2 | 8/2009 | Yang et al. | |
| 7,578,869 B2 | 8/2009 | Yang et al. | |
| 7,704,921 B2 | 4/2010 | Bool, III et al. | |
| 7,722,843 B1 * | 5/2010 | Srinivasachar | 423/210 |
| 7,731,780 B1 | 6/2010 | Durham et al. | |
| 7,753,992 B2 | 7/2010 | Yang et al. | |
| 7,766,997 B2 | 8/2010 | Lindau | |
| 7,771,700 B2 | 8/2010 | Mauldin et al. | |
| 7,776,780 B1 | 8/2010 | Granite et al. | |
| 7,780,765 B2 | 8/2010 | Srinivasachar et al. | |
| 7,858,061 B2 | 12/2010 | Varma et al. | |
| 7,887,618 B2 | 2/2011 | Nelson | |
| 8,007,749 B2 | 8/2011 | Chang et al. | |
| 8,017,550 B2 | 9/2011 | Chao et al. | |
| 8,057,576 B1 | 11/2011 | Pollack | |
| 8,069,797 B2 | 12/2011 | Srinivasachar et al. | |
| 8,080,088 B1 | 12/2011 | Srinivasachar | |
| 2002/0198097 A1 * | 12/2002 | El-Shoubary et al. | 502/56 |
| 2003/0206843 A1 | 11/2003 | Nelson, Jr. | |
| 2005/0039598 A1 * | 2/2005 | Srinivasachar | B01D 53/10 95/134 |
| 2006/0034743 A1 | 2/2006 | Radway et al. | |
| 2006/0204418 A1 | 9/2006 | Chao et al. | |
| 2007/0104631 A1 * | 5/2007 | Durante et al. | 423/210 |
| 2007/0123419 A1 * | 5/2007 | Le Bec | 502/416 |
| 2007/0234902 A1 | 10/2007 | Fair et al. | |
| 2007/0254807 A1 | 11/2007 | Bisque et al. | |
| 2007/0265161 A1 | 11/2007 | Gadkaree et al. | |
| 2008/0254972 A1 | 10/2008 | Istvan et al. | |
| 2008/0286183 A1 | 11/2008 | Radway | |
| 2009/0007785 A1 * | 1/2009 | Kimura | B01D 53/02 95/134 |
| 2009/0056538 A1 | 3/2009 | Srinivasachar et al. | |
| 2009/0081092 A1 | 3/2009 | Yang et al. | |
| 2009/0111690 A1 * | 4/2009 | Gadkarec et al. | 502/417 |
| 2009/0233789 A1 | 9/2009 | Gadkaree et al. | |
| 2010/0018395 A1 | 1/2010 | Srinivasachar et al. | |
| 2010/0126345 A1 | 5/2010 | Gupta et al. | |
| 2010/0202946 A1 | 8/2010 | Yang et al. | |
| 2011/0020205 A1 | 1/2011 | Kawamura et al. | |
| 2011/0030592 A1 | 2/2011 | Baldrey et al. | |
| 2011/0076210 A1 | 3/2011 | Pollack et al. | |
| 2011/0250111 A1 | 10/2011 | Pollack et al. | |

OTHER PUBLICATIONS

International Search Report and Written Opinion in relation to PCT/US2012/66861 (Feb. 8, 2013).

* cited by examiner

MULTI-FUNCTIONAL COMPOSITION OF MATTER FOR RAPID REMOVAL OF MERCURY FROM A FLUE GAS

CROSS-REFERENCE TO RELATED APPLICATIONS

This application claims priority to U.S. Provisional Patent Application No. 61/553,000, filed Oct. 28, 2011, entitled "MULTI-FUNCTIONAL COMPOSITION FOR RAPID REMOVAL OF MERCURY FROM A FLUE GAS," which is incorporated herein by reference in its entirety.

FIELD

This disclosure relates to the field of compositions for the rapid and efficient removal of mercury from a fluid stream such as a flue gas stream.

BACKGROUND

Mercury (Hg) is a highly toxic compound and exposure at appreciable levels can lead to adverse health effects for people of all ages, including harm to the brain, heart, kidneys, lungs, and immune system. Mercury is naturally occurring but is also emitted from various human activities, such as burning fossil fuels and other industrial processes. For example, in the United States about 40% of the mercury introduced into the environment comes from coal-fired power plants.

In the United States and Canada, federal and state/provincial regulations have been implemented or are being considered to reduce mercury emissions, particularly from coal-fired power plants, steel mills, cement kilns, waste incinerators and boilers, industrial coal-fired boilers, and other coal combusting facilities. For example, the United States Environmental Protection Agency (U.S. EPA) has promulgated Mercury Air Toxics Standards (MATS), which would among other things require coal-fired power plants to capture approximately 90% of their mercury emissions beginning in 2016.

The leading technology for mercury control from coal-fired power plants is activated carbon injection. Activated carbon injection involves the injection of sorbents, particularly powdered activated carbon, into flue gas emitted by the boiler of a power plant. Powdered activated carbon is a porous carbonaceous material having a high surface area, which exposes significant amounts of beneficial chemically functional and catalytic reaction sites and which creates high adsorptive potential for many compounds, including capturing mercury from the flue gas. Activated carbon injection technology has shown the potential to control mercury emissions in most coal-fired power plants, even those plants that may achieve some mercury control through control devices designed for other pollutants, such as wet or dry scrubbers used to control sulfur dioxide and acid gases.

SUMMARY

According to the present disclosure, the capture and removal of mercury from a boiler flue gas through activated carbon injection can be characterized by three primary steps, which may occur sequentially or simultaneously: (1) contact of the injected sorbent with the mercury species, which is typically present in very dilute concentrations in the flue gas (e.g., <100 parts per billion); (2) conversion of elemental mercury (i.e., $Hg^0$), which is relatively inert and not easily adsorbed, into an oxidized mercury species (e.g., $Hg^+$ and $Hg^{+2}$), which is more readily adsorbable and is significantly more soluble in an aqueous solubilizing medium such as water; and (3) the diffusion of the oxidized mercury species into pores where it is held tightly (e.g., sequestered) without being released. The flue gas streams traverse the ductwork at very high velocities, such as in excess of 25 feet/second. Therefore, once injected, the sorbent must rapidly accomplish these three steps to contact, oxidize and sequester the mercury. In some instances, the sorbent only has a residence time of 1 to 2 seconds in the flue gas. Conventional powdered activated carbons and other similar sorbent products do not efficiently accomplish the three required steps within such constraints.

It would be advantageous to provide a novel composition of matter which overcomes the traditional limitations of conventional sorbents and can effectively act as a sorbent, catalyst, and solvent to efficiently and rapidly remove mercury from a flue gas stream, e.g., to meet governmental regulations for mercury emissions. In this regard, various embodiments of a composition of matter that is multi-functional are provided. These multi-functional compositions of matter overcome the limitations of conventional sorbents in that they can be injected into a flue gas stream to efficiently and rapidly remove mercury from the flue gas stream, e.g., to meet governmental regulations for mercury emissions.

The multi-functional composition of matter may comprise at least about 20 wt. % and not greater than about 75 wt. % fixed carbon, at least about 20 wt. % and not greater than about 50 wt. % minerals, at least about 1 wt. % and not greater than about 15 wt. % of a halogen, and at least about 3 wt. % and not greater than about 12 wt. % aqueous-based solubilizing medium. The multi-functional composition of matter may also have a median particle size of not greater than about 15 micron, a sum of micropore volume and mesopore volume of at least about 0.2 cc/g, and a ratio of micropore volume to mesopore volume of at least about 0.7 and not greater than about 1.5.

Each power plant has unique factors (e.g., power production capacity, coal feedstock, emissions control equipment, plant configurations, operating temperature and other conditions, etc.) that could cause mercury capture performance of the multi-functional composition of matter to vary from site to site. Thus, an informative way to compare the effectiveness of various compositions of matter to capture mercury is to conduct beta tests at a power plant to compare the mercury emissions while injecting the multi-functional composition versus injecting a standard commercially available product under similar conditions.

In one characterization, a multi-functional composition of matter, when injected in a beta test at a coal-fired power plant combusting high rank coal, will result in emissions of mercury of less than 1.2 lb Hg/TBtu at composition injection rates (in lbs/MMacf (one million actual cubic feet)) of at least approximately 30% less as compared to a standard commercially available powdered activated carbon product identified herein as Comparative Sample C under comparable operating conditions. In yet another characterization, a multi-functional composition of matter, when injected in a beta test at a coal-fired power plant combusting high rank coal, will result in emissions of mercury of less than 1.2 lb Hg/TBtu at composition injection rates (in lbs/MMacf) of at least approximately 60% less as compared to a conventional powdered activated carbon product identified herein as Comparative Sample C under comparable operating conditions.

In another characterization, a composition of matter when injected in a beta test at a coal-fired power plant combusting high rank coal and when the mercury emission rate (lb Hg/Tbtu) is plotted as a function of the composition injection rate (lbs/MMacf), the slope of the trendline with the highest $R^2$ value (i.e., the correlation coefficient) at 1.2 lbs Hg/Tbtu will be more negative than about −0.6. In yet another characterization, a composition of matter when injected in a beta test at a coal-fired power plant combusting high rank coal and when the mercury emission rate (lb Hg/Tbtu) is plotted as a function of the composition injection rate (lbs/MMacf), the slope of the trendline with the highest $R^2$ value at 1.2 lbs Hg/Tbtu will be more negative than about −1.5.

In another characterization, a multi-functional composition of matter, when injected in a beta test at a coal-fired power plant combusting low rank coal, will result in emissions of mercury of less than 4.0 lb Hg/TBtu at composition injection rates (in lbs/MMacf) of at least approximately 50% less as compared to a conventional powdered activated carbon product identified herein as Comparative Sample D under comparable operating conditions.

In another characterization, a composition of matter when injected in a beta test at a coal-fired power plant combusting low rank coal and when the mercury emission rate (lb Hg/Tbtu) is plotted as a function of the composition injection rate (lbs/MMacf), the slope of the trendline with the highest $R^2$ value at 4.0 lbs Hg/Tbtu will be more negative than about −8.0.

In another characterization, the minerals of the multi-functional composition of matter are native to a feedstock that is used for the manufacture of the multi-functional composition of matter. In another characterization, the multi-functional composition of matter comprises of minerals from the group consisting of calcium-containing minerals, potassium-containing minerals, iron-containing minerals, silicon-containing minerals, silicate-containing minerals, sodium-containing minerals, tin-containing minerals, zinc-containing minerals, magnesium-containing minerals, alumino-silicate containing minerals and combinations thereof. In one particular characterization, the minerals comprise oxide minerals. In another characterization, the minerals comprise at least 1 wt. % iron-containing minerals.

In another characterization, the multi-functional composition of matter comprises at least about 3 wt. % and not greater than about 8 wt. % aqueous-based solubilizing medium.

In another characterization, the multi-functional composition of matter has a median particle size of not greater than about 12 micron. In yet another characterization, the multi-functional composition of matter has a median particle size of at least about 5 micron.

In another characterization, the multi-functional composition of matter has a Hardgrove Grindability Index of at least about 90. In yet another characterization, the multi-functional composition of matter has a Hardgrove Grindability Index of at least about 100.

In another characterization, the multi-functional composition of matter has a mercury particle density of at least about 0.5 g/cc and not greater than about 0.9 g/cc. In another characterization, the multi-functional composition of matter has an envelope particle density of at least about 0.3 g/cc and not greater than about 1.5 g/cc. In yet another characterization, the multi-functional composition of matter has an envelope particle density of at least about 0.5 g/cc and not greater than about 1.0 g/cc.

In another characterization, the sum of micropore volume plus mesopore volume of the multi-functional composition of matter is at least about 0.25 cc/g.

In another characterization, the porosity of the multi-functional composition of matter is controlled such that the mesopore volume of the multi-functional composition of matter is at least about 0.10 cc/g and is not greater than about 0.15 cc/g, the micropore volume of the multi-functional composition of matter is at least about 0.10 cc/g and is not greater than about 0.15 cc/g, and the ratio of micropore volume to mesopore volume is greater than about 0.9 and less than about 1.5.

In another characterization, the pH of the multi-functional composition of matter is greater than about 8 and is less than about 12.

In another characterization, when the multi-functional composition of matter is analyzed by Scanning Electron Microscopy and Energy Dispersive Spectrometry at a magnification of 12,000 times over at least a 20 micron by 10 micron image area, the pixels attributed to the halogen exhibit a mean width of at least about 0.05 micron and not greater than about 2 micron, wherein the overall pixel area attributed to the halogen represents at least about 10% of the overall image area. In a further characterization, when the composition of matter is analyzed by Scanning Electron Microscopy and Energy Dispersive Spectrometry at a magnification of 12,000 times over at least a 20 micron by 15 micron image area, the pixels attributed to the halogen appear in at least 20% of the pixel area in any 10 micron by 10 micron scanning area.

DETAILED DESCRIPTION

Various embodiments of a multi-functional composition of matter are provided that are particularly useful when injected into a fluid gas stream such as a flue gas stream (e.g., from a coal-burning boiler or a waste energy boiler) to rapidly and efficiently capture and remove mercury from the flue gas stream. In this regard, the multi-functional composition of matter advantageously includes several different components that synergistically may (1) increase the probability of contact with mercury species in the flue gas, (2) decrease the time required for mercury oxidation and capture (e.g., as a result of enhanced oxidation reaction kinetics and/or mass diffusional kinetics), and (3) advantageously reduce the total amount of material that must be injected to recover sufficient amounts of mercury to meet mercury removal criteria, such as applicable government regulations.

Figure 1:
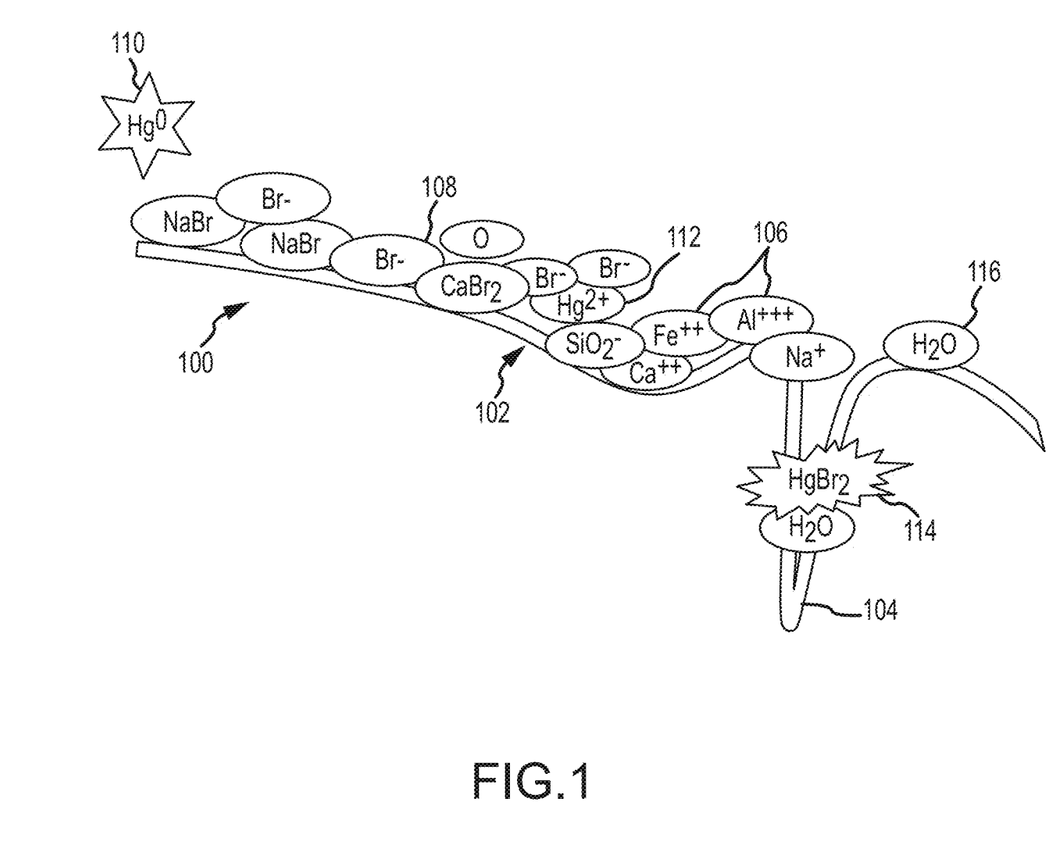
FIG. 1 schematically illustrates an example of the surface of a multi-functional composition of matter.

In this regard, the multi-functional composition of matter may include a carbonaceous material (e.g., fixed carbon), minerals, a halogen (e.g., in the form of a halide salt such as bromide salt), and an aqueous solubilization medium that together synergistically oxidize mercury and enhance the removal of mercury from a fluid stream, e.g., from a flue gas stream. For example, the minerals and the halogen may enhance the oxidation of elemental mercury, and the aqueous solubilizing medium (e.g., water) may solubilize the oxidized mercury and enhance mass diffusional kinetics. In addition, the multi-functional composition of matter may have various beneficial physical attributes such as a relatively small particle size and well-controlled pore size distribution. As illustrated in FIG. 1, a multi-functional composition of matter containing a synergistic combination of minerals, halogen, and carbonaceous material having a small particle size and well-controlled pore size distribution provides a relatively large surface area on which kinetic mechanisms occur, and provides a sufficient capture mechanism to rapidly and efficiently sequester mercury from boiler flue gas.

Referring to FIG. 1, the multi-functional composition of matter 100 may contain a porous carbonaceous material 102 (e.g., fixed carbon) that is adapted to provide a large surface area in the appropriate pore size for the mercury oxidation and to sequester the oxidized mercury from the flue gas stream. The multi-functional composition of matter 100 may include at least about 10 weight percent of fixed carbon 102, such as at least about 15 weight percent or even at least about 20 weight percent fixed carbon 102. However, it is preferred that the fixed carbon content of the multi-functional composition of matter 100 not exceed about 75 weight percent, such as not greater than about 60 weight percent, or such as not greater than about 55 weight percent fixed carbon 102. Due to a well-controlled pore structure 104 and the presence of the other components in the multi-functional composition of matter 100, a relatively low amount of fixed carbon 102 is required for mercury oxidation and sequestration (e.g., a low amount of fixed carbon per unit volume of the flue gas stream as compared to typical sorbent compositions).

In one aspect, the multi-functional composition of matter 100 may have a relatively low average particle size (e.g., median particle size, also known in the art as $d_{50}$), particularly as compared to typical sorbent compositions used for activated carbon injection. In this regard, the multi-functional composition of matter 100 may have a median particle size not greater than about 15 micron, such as not greater than about 12 micron. In another characterization, the multi-functional composition of matter 100 may have a median particle size of at least about 5 micron, such as at least about 6 micron or even at least about 8 micron. The $d_{50}$ median particle size may be measured using techniques such as light scattering techniques (e.g., using a Saturn DigiSizer II, available from Micromeritics Instrument Corporation, Norcross, Ga.). A relatively small median particle size, such as not greater than about 15 micron, means greater surface area per volume of the multi-functional composition. The increased surface area results in many benefits, including, but not limited to, increased exposure of the mercury to minerals and halogen, increased area available for reactions to occur, and thus overall improved reaction kinetics.

The multi-functional composition of matter 100 may also have a high pore volume and a well-controlled distribution of the pores 104, particularly among the mesopores (i.e., from 20 Å to 500 Å width) and the micropores (i.e., not greater than 20 Å width). It has been found that a well-controlled distribution of micropores and mesopores is desirable for effective removal of mercury from the flue gas stream. In this regard, while not wishing to be bound by any theory, it is believed that the mesopores are the predominant structures for capture and transport of the oxidized mercury species to the micropores, whereas micropores are the predominate structures for sequestration of the oxidized mercury species.

In this regard, the sum of micropore volume plus mesopore volume of the multi-functional composition of matter 100 may be at least about 0.10 cc/g, such as at least 0.20 cc/g, and at least about 0.25 cc/g or even at least about 0.30 cc/g. The micropore volume of the multi-functional composition of matter may be at least about 0.10 cc/g, such as at least about 0.15 cc/g. Further, the mesopore volume of the multi-functional composition of matter 100 may be at least about 0.10 cc/g, such as at least about 0.15 cc/g. In one characterization, the ratio of micropore volume to mesopore volume may be at least about 0.7, such as 0.9, and may be not greater than about 1.5. Such levels of micropore volume relative to mesopore volume advantageously enable efficient capture and sequestration of oxidized mercury species, such as $HgBr_2$, by the multi-functional composition of matter 100. Pore volumes may be measured using gas adsorption techniques (e.g., $N_2$ adsorption) using instruments such as a TriStar II Surface Area Analyzer (Micromeritics Instruments Corporation, Norcross, Ga., USA).

The multi-functional composition of matter 100 may also be characterized by having a well-controlled particle density. Particle density is the mass of the particle over the volume of the particle (excluding pore volume of larger pores that do not contribute to adsorption), and is typically measured in g/cc. Particle density correlates to the surface area to volume ratio of the multi-functional composition of matter, which in turn affect mercury capture performance. Two methods of measuring particle density are described below.

Particle density can be measured by liquid mercury volume displacement, in which case the result is referred to as the mercury particle density. In this regard, the multi-functional composition of matter 100 may have a mercury particle density of at least about 0.5 g/cc, such as at least about 0.6 g/cc. Conversely, the mercury particle density of the multi-functional composition of matter may be not greater than about 0.9 g/cc, such as not greater than about 0.8 g/cc. Mercury particle density may be measured by the Micromeritics AccuPyc Pycnometer (Micromeritics Inc., Norcross, Ga., USA).

Particle density can also be measured by sedimentary volume displacement, in which case the result is referred to as the envelope particle density. In this regard, the envelope particle density of the multi-functional composition of matter 100 may be at least about 0.5 g/cc, such as at least about 0.6 g/cc or at least about 0.7 g/cc. The envelope density of the multi-functional composition of matter 100 may be not greater than about 1.0 g/cc, such as not greater than about 0.9 g/cc. Envelope particle density may be measured using a Micromeritics GeoPyc Envelope Density Analyzer (Micrometrics, Inc., Norcross, Ga., USA).

Another component of the multi-functional composition of matter 100 is minerals 106. In one characterization, such minerals 106 may be native to the feedstock from which the carbonaceous material is formed (e.g., by activation). In another characterization, some portion of the minerals 106 may be separately added to the multi-functional composition of matter, which requires additional expenses. While not wishing to be bound by any theory, it is believed that such minerals 106 may advantageously facilitate the oxidation of the elemental mercury in the flue gas stream. The presence of such minerals 106 may thereby enhance the kinetics of the mercury oxidation such that a reduced contact time with the flue gas stream is required to oxidize and remove sufficient amounts of mercury from the flue gas stream as compared to sorbents without such minerals.

The minerals 106 may advantageously be comprised of minerals including, but not limited to, aluminum-containing minerals, calcium-containing minerals, iron-containing minerals, silicon-containing minerals, silicate-containing minerals, sodium-containing minerals, potassium-containing minerals, zinc-containing minerals, tin-containing minerals, magnesium-containing minerals, and combinations thereof. The minerals may predominantly be oxide-based minerals, such as metal oxide minerals (e.g., CaO, $Fe_2O_3$, $Fe_3O_4$, FeO, $Al_2O_3$), and silicates (e.g. $Al_2SiO_5$). In one characterization, the minerals 106 predominantly include metal oxides, particularly aluminum oxides and iron oxides. In another characterization, the minerals 106 include calcium-containing minerals, iron-containing minerals and alumino-silicates. These types of minerals are particularly well adapted to catalyze the oxidation reaction of the mercury. Iron-containing minerals are particularly well adapted to catalyze the oxidation reaction, and in one characterization, the minerals include at least 1 wt. % iron-containing minerals. The minerals 106 are intimately intertwined within the multi-functional composition of matter within a well controlled porous structure that facilitates the oxidation, capture and removal of mercury.

To provide sufficient reaction activity and rapid oxidation kinetics, the multi-functional composition of matter 100 may include at least about 20 weight percent of the minerals, such as at least 25 weight percent and even at least about 30 weight percent of the minerals. However, excessive amounts of the minerals 106 in the multi-functional composition of matter 100 may be detrimental to the capture of mercury. In this regard, the multi-functional composition of matter 100 may include not greater than about 50 weight percent of the minerals, such as not greater than about 45 weight percent. Advantageously, the multi-functional composition of matter may include not greater than about 40 weight percent of the minerals, such as not greater than about 35 weight percent. The total mineral content may be measured by a TGA701 Thermalgravitmetric Analyzer (LECO Corporation, St. Joseph, Mich.). The specific types and amount of particular minerals may be measured by the Niton XL3t X-Ray Fluorescence (XRF) Analyzer (Thermo Fisher Scientific Inc., Waltham, Mass.).

The multi-functional composition of matter 100 also includes an active halogen 108. Halogens by themselves are not known to be oxidants for mercury, but are a vital reaction participant in the oxidation of mercury. The multi-functional composition of matter 100 may include at least about one weight percent of the active halogen 108, such as at least 2 weight percent. Significantly increased amounts of the halogen 108 may be detrimental to mercury capture and sequestration, and also can contribute to equipment corrosion and excessive bromine emissions in downstream liquid and gas streams, which may require further treatment processes. Therefore, the active halogen content of the multi-functional composition of matter may advantageously not exceed about 15 weight percent, such as not greater than about 10 weight percent.

It is an important aspect of the multi-function composition of matter that the accessibility of the active halogen 108 (e.g., Br) is very high in order to facilitate mercury oxidation. In this regard, the halogen deposits may have primarily colloidal dimensions rather than granular dimensions. For example, these halogen deposits may have a mean width of at least about 0.5 micron and not greater than about 2.0 micron (in colloidal dimensions, as determined by Scanning Electron Microscopy (SEM) and Energy Dispersive Spectroscopy (EDS), as opposed to individual molecular dimensions). As stated above, the halogen 108 is not by itself an oxidant but can participate as a reactant and therefore enhance the oxidation of mercury. In this regard, while not wishing to be bound by any theory, it is believed that the halogen 108 and the other features of the multi-functional composition of matter 100 synergistically enhance the oxidation of elemental mercury ($Hg°$) to oxidized mercury ($Hg^{2+}$) 112, particularly in the aqueous solubilization conditions (e.g., high moisture flue gas conditions). It is believed that such a combination precludes the need to treat the multi-functional composition of matter with a more expensive and corrosive form of bromine (for example $Br_2$).

Figure 2:
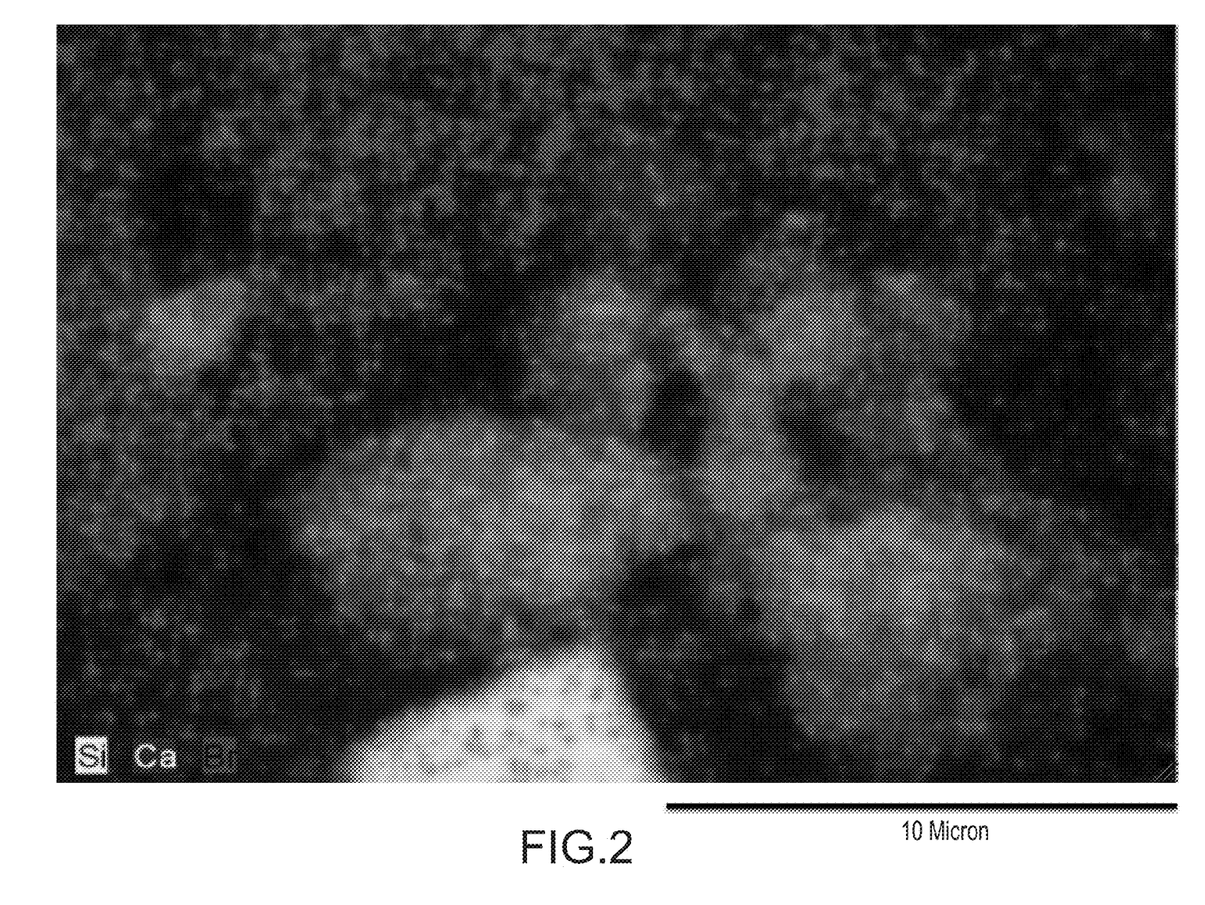
FIG. 2 illustrates an image of colloidal bromide salt on the surfaces of multi-functional composition of matter taken by Scanning Electron Microscopy coupled with Energy Dispersive Spectrometry.

Thus, as illustrated in FIG. 2, the halogen may advantageously be dispersed throughout the multi-functional composition of matter in a colloidal fashion, particularly on the composition's surfaces which are in contact with the flue gas, e.g., as determined by SEM with EDS. SEM images the composition while EDS enables the identification of the location of specific elements. Providing a highly dispersed halogen facilitates rapid reaction kinetics. This dispersion reflects a favorable approach to an application of halogens to the multi-functional composition of matter. The halogen is more effective when accessible and well-dispersed (i.e., not in clumps or as a solid mix in the form of separate particles). In one characterization, when the multi-functional composition of matter is analyzed by SEM and EDS at a magnification of 12,000 times over at least a 20 micron by 10 micron image area, the pixels attributed to the halogen (e.g., using EDS) exhibit a mean width of at least about 0.05 micron and not greater than about 2 micron, wherein the overall pixel area attributed to the halogen represents at least about 3% of this overall image area, for example at least about 10% of the overall image area, or even at least about 20% of the overall image area. In a further characterization as illustrated in FIG. 2, when the composition of matter is analyzed by SEM and EDS at a magnification of 12,000 times over at least a 20 micron by 15 micron image area, the pixels attributed to the halogen appear in at least 20% of the pixel area in any 10 micron by 10 micron scanning area.

In addition to the foregoing, the multi-functional composition of matter has additional beneficial surface chemistry characteristics. For example, flue gas is typically acidic. When sequestering metals like mercury in such an environment, it is advantageous to solubilize the metal prior to capture, which often requires specific ionic conditions. Thus, the multi-functional composition of matter may have a pH of the surface greater than 8 and not greater than about 12.

Moreover, and referring back to FIG. 1, the multi-functional composition of matter 100 may also include an amount of aqueous-based solubilizing medium such as water 116. Such aqueous-based solubilizing medium can combat the acidity of the flue gas, enhance the mass diffusional kinetics of mercury oxidation and sequestration reactions by solubilizing oxidized mercury species within the pore structure, and prevent captured mercury from re-solubilizing and reentering the flue gas. In this regard, the multi-functional composition of matter may include at least about 2 weight percent of the solubilizing medium, such as at least about 3 weight percent or at least about 6 weight percent. However, the amount of solubilizing medium in the multi-functional composition of matter should be not greater than about 12 weight percent, such as not greater than about 10 weight percent to avoid interfering with the mercury oxidation reaction(s) and consuming carbon adsorption capacity.

While not wishing to be bound by any particular theory, FIG. 1 schematically illustrates the mechanisms that are believed to be responsible for the rapid oxidation and sequestration of mercury from a flue gas stream using the multi-functional compositions of matter disclosed herein. The fixed carbon 102 provides a large surface area for the elemental mercury 110 to react with the active halogen 108, minerals 106, and other components of the multi-functional composition of matter 100. The minerals 106 that are in close proximity with other redox agents on or near the surface advantageously catalyze, oxidize, enhance, and/or otherwise facilitate the oxidation of the mercury and the formation of oxidized mercury species 112 such as $Hg^{+2}$, which can bond with the halogen to form such species as $HgBr_2$ 114. The presence of aqueous-based solubilizing medium on the multi-functional composition of matter (e.g., water 116) facilitates the redox activity, the transport of these mercury species 114 within the pore structure 104, and the solubilization of these mercury species 114 within the pores 104 to sequester the mercury species 114 therein. As a result, the mercury oxidation kinetics and the mass diffusional kinetics are enhanced to enable the rapid and efficient oxidation and sequestration of mercury by the multi-functional composition of matter 100.

The enhanced reaction and diffusional kinetics of the multi-functional composition of matter may enable coal-burning facilities (e.g., a coal-fired power plant) to rapidly and efficiently capture mercury to meet regulatory limits on mercury emissions. For example, the U.S. EPA Mercury Air Toxic Standards (MATS) set mercury emission limits based on the amount of mercury per amount of power produced of 1.2 lb Hg/Tbtu for coal-fired power plants combusting high rank coals (i.e., coals having >8,300 Btu/lb) and of 4.0 lb Hg/Tbtu for facilities combusting low rank coals (i.e., coals having <=8,300 Btu/lb).

Figure 3:
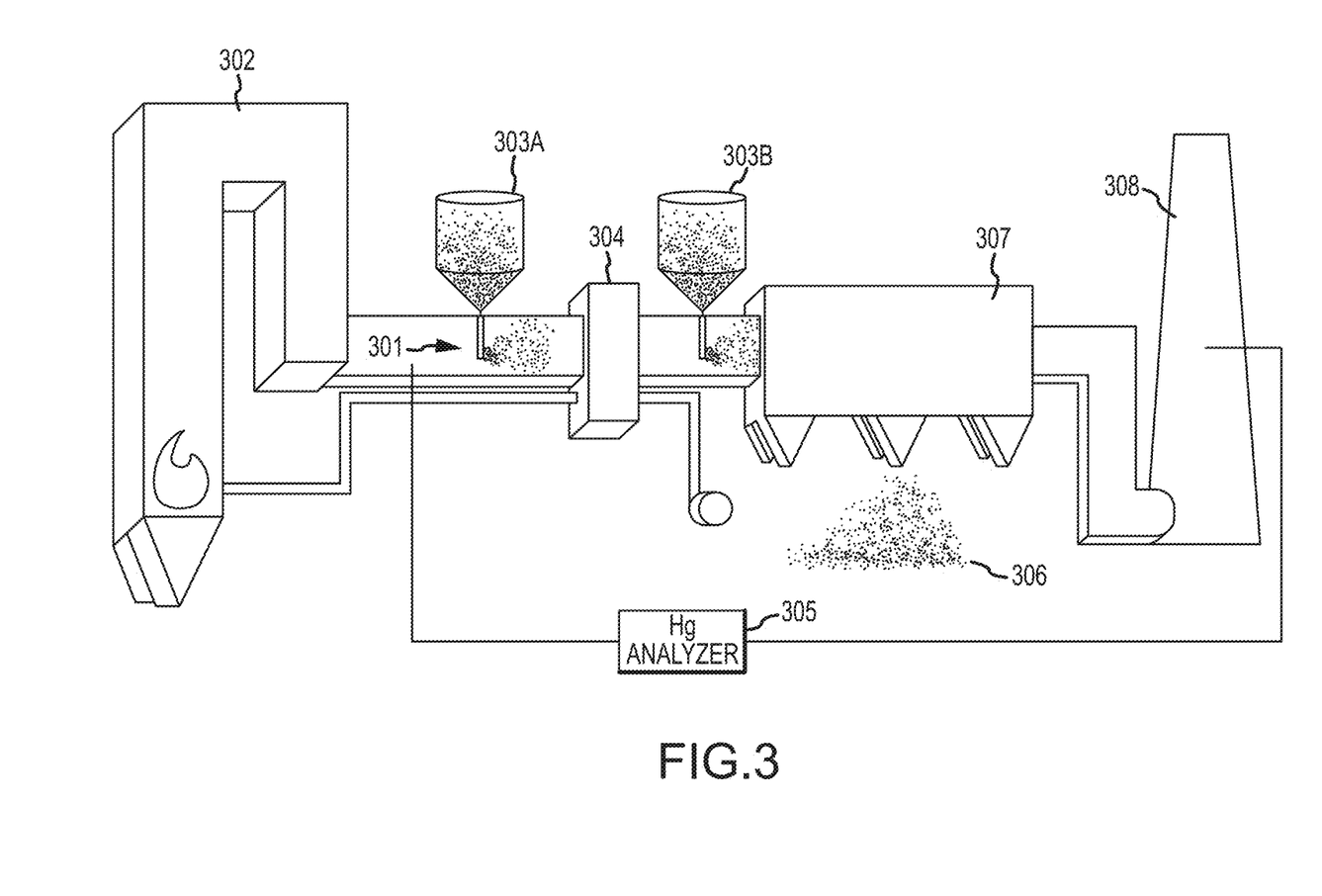
FIG. 3 schematically illustrates a sample plant configuration and method for the capture and sequestration of mercury from a flue gas stream.

FIG. 3 illustrates a system and method for removal of mercury from a flue gas stream produced by a coal-burning power plant using activated carbon injection to contact the multi-functional composition of matter with the flue gas stream. The flue gas stream 301 exits a boiler 302 where coal has been combusted. As illustrated in FIG. 3, the flue gas stream 301 may then proceed to an air heater unit 304 where the temperature of the flue gas stream 301 is reduced. Thereafter, the flue gas stream 301 maybe introduced to a separation unit 307 such as an electrostatic precipitator (ESP) or a fabric filter bag house which removes particulate matter from the flue gas, before exiting out a stack 308. For example, a cold-side (i.e., after the air heater unit) electrostatic precipitator can be used. It will be appreciated by those skilled in the art that the plant may include other devices not illustrated in FIG. 3, such as a selective catalytic reduction unit (SCR) and the like, and may have numerous other configurations. In order to capture mercury from the flue gas, the multi-functional composition of matter may be introduced (e.g., injected into) to the flue gas stream 301 either before 303A or after 303B the air heater unit 304, but before the separation unit 307 which will remove it from the flue gas.

The nature of the multi-functional composition of matter may advantageously enable a diminished amount of the multi-functional composition of matter to be injected into the flue gas stream to obtain high mercury removal rates as compared to typical sorbent compositions. The amount of multi-functional composition of matter required to remove mercury from the flue gas stream will vary depending upon the composition of the coal and process emission control steps. Therefore, it is advantageous to define a percent removal of mercury from the coal or fuel burned in the boiler, as percent removed in pounds of mercury per trillion BTU of fuel calorimetric heating value (lb Hg/Tbtu) from coal as measured at the plant stack 308 in accordance with US EPA MATS methodologies. The ability to capture high levels of mercury while injecting less sorbent, may advantageously reduce material cost to the power plant operator.

While the separation unit 307 may be selected from a number of devices, including an ESP or a fabric filter bag house, the multi-functional composition of matter disclosed herein is particularly useful for removing mercury from the flue gas stream 301 when an ESP is utilized as the separation unit 307. For example, the separation unit 307 can be a cold-side ESP. While ESP units generally have a lower capital cost than a fabric filter bag house unit, fabric filter bag house units are often utilized to increase the contact time between the sorbent composition and the flue gas stream because the unit traps the sorbent and the flue gas continues to pass through the sorbent on the filter until the filter is rapped to remove the sorbent and other trapped materials. Such resident times are often deemed necessary to adequately capture mercury from the flue gas stream with temperatures of less than 350° F. However, utilizing the multi-functional composition of matter disclosed herein, which provides rapid kinetics for the oxidation reaction and mass diffusion of mercury species, even very short residence times (e.g., the contact times) between the flue gas stream and the multi-functional composition of matter are sufficient to remove at least about 85% of the mercury from the flue gas stream, such as at least about 90% of the mercury. In this regard, the residence time may be not greater than about 5 seconds, such as not greater than about 3 seconds or even not greater than about 1 second.

Figure 4:
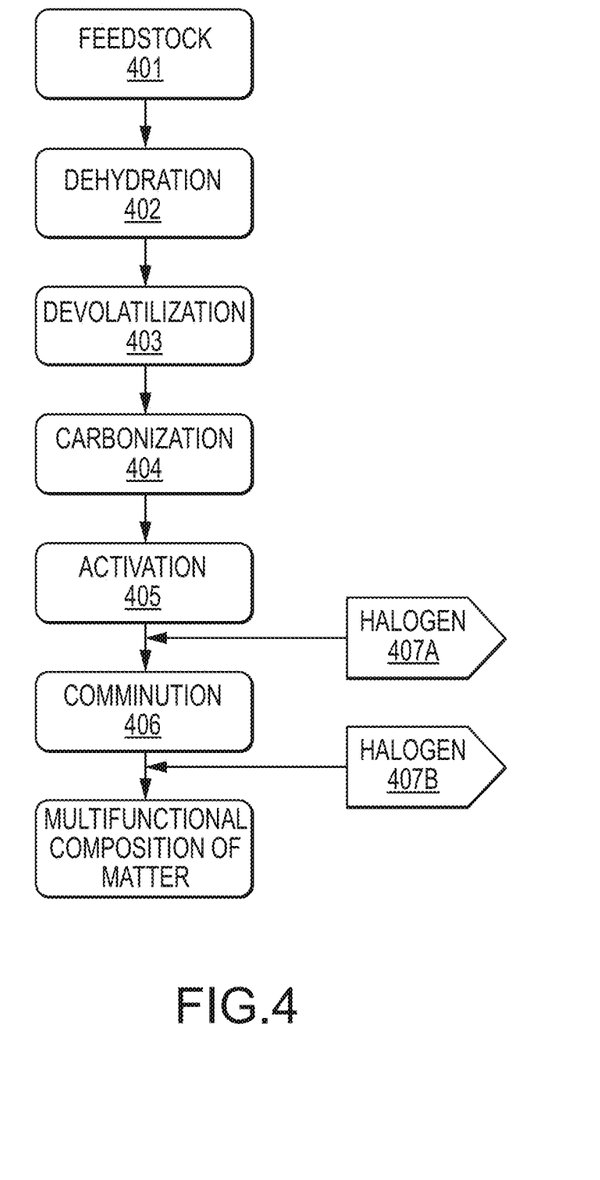
FIG. 4 illustrates a flow sheet for the manufacture of a multi-functional composition of matter.

FIG. 4 is a flow sheet that illustrates an exemplary method for the manufacture of a multi-functional composition of matter in accordance with one embodiment. The manufacturing process begins with a carbonaceous feedstock 401 such as low-rank lignite coal with a relatively high content of natural deposits of native minerals. In the manufacturing process, the feedstock is subjected to an elevated temperature and one or more oxidizing gases under exothermic conditions for a period of time to sufficiently increase surface area, create porosity, alter surface chemistry, and expose and exfoliate native minerals previously contained within feedstock. The specific steps in the process include: (1) dehydration 402, where the feedstock is heated to remove the free and bound water, typically occurring at temperatures ranging from 100-150° C.; (2) devolatilization 403, where free and weakly bound volatile organic constituents are removed, typically occurring at temperatures above 150° C.; (3) carbonization 404, where non-carbon elements continue to be removed and elemental carbon is concentrated and transformed into random amorphous structures, typically occurring at temperatures around the 350-800° C.; and (4) activation 405, where steam, air or other oxidizing agent is added and pores are developed, typically occurring at temperatures above 800° C. The manufacturing process may be carried out, for example, in a multi-hearth or rotary furnace. The manufacturing process is not discrete and steps can overlap and use various temperatures, gases and residence times within the ranges of each step to promote desired surface chemistry and physical characteristics of the manufactured product.

After activation 405, the product may be subjected to a comminution step 406 to reduce the particle size (e.g., the median particle size) of the product. Comminution 406 may occur, for example, in a mill such as a roll mill, jet mill or other like process. Comminution 406 may be carried out for a time sufficient to reduce the median particle size of the thermally treated product to not greater than about 15 micron, such as not greater than about 12 micron.

Advantageously, the multi-functional composition of matter may have a relatively high Hardgrove Grindability Index (HGI), as measured by ASTM Method D409. The HGI was developed to empirically measure the relative difficulty of grinding coal to the particle size necessary for complete combustion in a coal boiler furnace. The use of HGI has been extended to grinding coal for other purposes such as iron-making, cement manufacture and chemical industries utilizing coal. Particulate materials of low value HGI are more difficult to grind than those with high values. Mill capacity also falls when grinding materials with a lower HGI. In this regard, the HGI of the multi-functional composition of matter may be at least about 80 such as at least about 90, at least about 100 or even at least about 110. The relatively high HGI enables the average particle size to be reduced with relatively low energy consumption. Further, the relatively soft materials of the multi-functional composition of matter will lead to reduced erosion (e.g., attrition) of the comminuting equipment as compared to harder materials. While not wishing to be bound by any theory, it has been observed that utilizing lignite matter feedstock will lead to a relatively high HGI.

The halogen may be added to the product at any stage after the activation process. For example, as illustrated in FIG. 4, halogen may be introduced either before 407A or after 407B comminution. The halogen may be introduced as a dry or wet halide salt.

EXAMPLES

A beta test is a full-scale evaluation of the ability of an emission control technology at a coal-burning power plant to remove mercury from the flue gas. The first step is to establish baseline mercury emissions using a methodology certified by US EPA, specifically either Method 30A (Determination of Total Vapor Phase Mercury Emissions from Stationary Sources (Instrumental Analyzer Procedure)) or Method 30B (Determination of Total Vapor Phase Mercury Emissions From Coal-Fired Combustion Sources Using Carbon Sorbent Traps), each available in 40 CFR Part 60 Appendix A-8 to Part 60. Method 30A describes the use of a mercury continuous emission monitoring systems (Hg CEMs) (e.g., manufactured by Thermo Fisher Scientific Inc. of Waltham, Mass.), while Method 30B describes testing using sorbent traps (e.g, manufactured by Ohio Lumex Co. of Twinsburg, Ohio). If Method 30A is used, then mercury emissions are measured after a relatively steady-state of mercury emissions is achieved over at least a one-hour period based on a time-weighted average measurement. If Method 30B is used, mercury emissions are calculated based on (1) mercury captured in at least three pair of traps placed into the flue gas stream once the desired testing conditions are in a steady state, and (2) the average air emissions rate from the unit being tested, which can be measured at the stack. Method 30B specifies quality procedures for the sorbent traps.

Once the baseline is established, the sorbent is injected into the flue gas at the desired rate and the mercury emissions are measured once a steady state of mercury emissions is achieved, typically after 15 minutes or so. This process is repeated for each sorbent at each desired injection rate under each desired operating condition. Typically, injection rates are varied beginning with a rate that is anticipated to not achieve EPA mercury emission limits (such as 0.5 lbs/MMacf or lower) to a rate that is expected to achieve or exceed the EPA mercury emission limits (such as 4.0 lbs/MMacf, 5.0 lbs/MMacf, or more). The amount of sorbent necessary to properly perform a beta test will depend on the desired injection rates, the conditions of the unit being tested and the EPA methodology used. Minimum testing requirements can be estimated based on the heat rate of the coal being burned (e.g., BTU per MW), the MW of the unit, the actual cubic feet of flow of flue gas, and the estimated time required to properly complete testing.

Operating conditions for each injection scenario should be recorded, including, but not limited to, coal type, temperature, load, and emissions control equipment and configuration. Temperature of the flue gas should be less than 350° F. and typically is between 275° F. and 325° F. Testing should be conducted at full load of the unit, and additional testing at reduced loads can be performed if desired. In addition, if the unit uses various coal types in the combustion process then additional testing should be done with the various coals. The specific order and types of emission control devices should be recorded along with other operating conditions. The injection rate at the EPA MATS mercury emissions limit correlates approximately to the amount of sorbent that must be injected to achieve regulatory compliance under a given set of operating conditions.

Each power plant has unique power production capacity, coal feedstock, emissions control equipment, plant configurations, operating temperature and other conditions, and a variety of other factors. See above discussion of FIG. 3. Variability in these factors can cause mercury capture performance of the multi-functional composition of matter to vary from plant to plant. Thus, an informative way to compare the effectiveness of various compositions of matter to capture mercury is to compare the composition's mercury emissions rate (lb Hg/Tbtu) as a function of the amount of matter injected (lb/MMacf) with a standard commercially available product under similar conditions at each plant. Standard commercially available products include PowerPAC Premium® and PowerPAC Premium® Plus (ADA Carbon Solutions, LLC, Littleton, Colo.); DARCO® Hg-LH (Norit Americas Inc., Marshall, Tex.); FLUEPAC®-MC Plus (Calgon Corporation, Pittsburgh, Pa.); and B-PAC™ (Albermarle Corporation, Baton Rouge, La.).

In the event that the beta testing results in at least 4 data points (including the baseline), the data can be plotted and fitted with a trendline function of the best fit, as dictated by the highest $R^2$ value. The trendline is typically a non-linear function such as power, logarithmic, or an exponential function. The slope of this trendline at the regulatory compliance limit can be calculated as the tangent of the curve at that point. Such slope gives an indication of a sorbent's potential rate of mercury oxidation and potential for additional mercury removal. Particularly, sorbents with a steeper and more negative slope are believed to have enhanced reaction kinetics that can result in much greater rates of mercury capture. Results of 2 beta tests are presented below.

Example 1

Example 1 illustrates the ability of two samples of the multi-functional composition of matter disclosed herein to remove mercury in coal-fired power plants combusting a high rank coal as compared to a typical sorbent composition.

The first sample of the multi-functional composition of matter (Sample A) has a median particle size of about 8 micron. The second sample of the multi-functional composition of matter (Sample B) has a median particle size of about 12 micron. Samples A and B both have a mineral content of about 35 wt. %, a fixed carbon content of about 50 wt. %, a sum of mesopore volume plus micropore volume of about 0.25 cc/g, a total mesopore volume of about 0.12 cc/g, and a total micropore volume of about 0.13 cc/g. Both samples include about 5.5 wt. % bromide salt.

These samples are compared to a prior art sorbent material (Comparative Sample C), specifically a sorbent composition referred to as a PowerPac Premium®, (ADA Carbon Solutions, LLC, Littleton, Colo.). Comparative Sample C has a median particle size of about 25 micron, a fixed carbon content of about 50 wt. %, a mineral content of about 40 wt. %, a sum of the micropore volume plus mesopore volume of about 0.25 cc/g, a total mesopore volume of about 0.13 cc/g, and a total micropore volume of about 0.12 cc/g. Comparative Sample C includes about 4.5 wt. % bromide salt.

Each of Samples A, B and C is injected into a flue gas from an approximately 200 MW electric generating unit combusting a high rank coal (Powder River Basin coal). In all cases, the composition is injected upstream of an air heater unit and is extracted using a cold-side electrostatic precipitator. A GEMS measures mercury before composition injection and also in the stack to measure mercury removal efficacy of the compositions.

Figure 5:
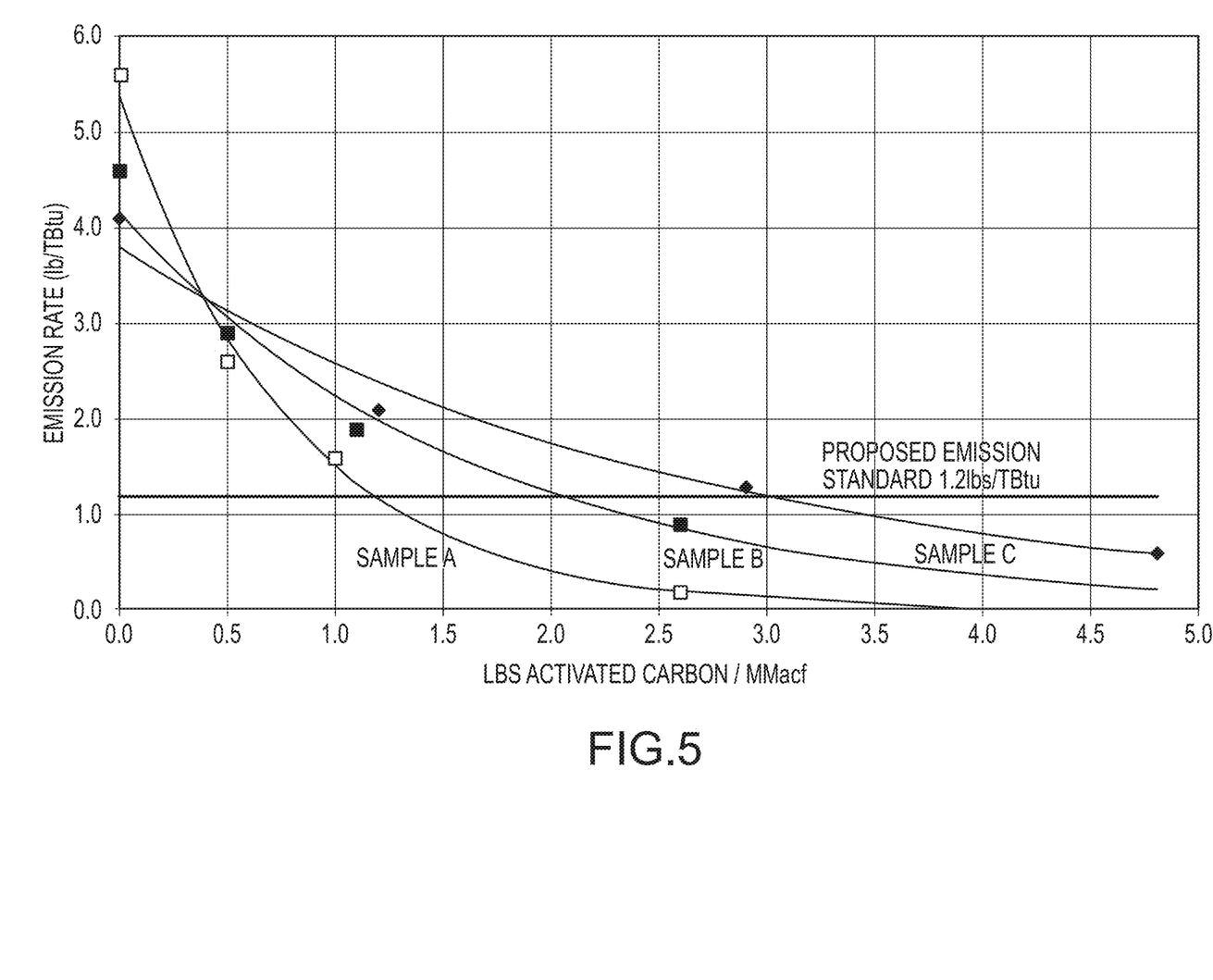
FIG. 5 presents mercury capture performance of an approximate 200 MW coal-fired power plant burning a high rank coal (Powder River Basin coal) comparing 2 formulations of a multi-functional composition of matter and a commercially available sorbent.

As illustrated in FIG. 5, which is a graph of mercury emission rates as a function of sorbent injection rate, Sample B achieves the US EPA compliance limit for high rank coals (1.2 lbs Hg/Tbtu) at approximately 33% less sorbent usage as compared to Comparative Sample C, and Sample A achieves the compliance limit at an injection rate of approximately 60% less sorbent usage as compared to Comparative Sample C. In other words, Comparative Sample C requires approximately more than about double the amount of Sample A to be injected in order to achieve the mercury compliance limit. In addition, the slopes of the mercury emission rate trendlines for Samples A and B at the compliance limit of 1.2 lbs Hg/Tbtu are approximately about −1.7 and about −0.7, respectively, which are greater than about 2.5 and 2 times steeper than the slope for Comparative Sample C, respectively. Consequently, injection of additional amounts of the multi-functional composition of matter ultimately capture more mercury than comparable additional amounts of the currently available sorbent, and would allow the facility to capture more mercury than that required by the regulatory limits.

Example 2

Example 2 illustrates the ability of a sample of the multi-functional composition of matter disclosed herein to remove mercury in coal-fired power plants combusting a low rank coal as compared to a typical sorbent composition.

The sample of the multi-functional composition of matter in this Example 2 is the same as Sample A described in Example 1.

The prior art sorbent material (Comparative Sample D) in this Example 2 is a sorbent composition referred to as a PowerPac Premium Plus™ (ADA Carbon Solutions, LLC, Littleton, Colo.). Comparative Sample D has a median particle size of about 25 micron, a fixed carbon content of about 50 wt. %, a native mineral content of about 40 wt. %, a sum of the micropore volume plus mesopore volume of about 0.25 cc/g, a total mesopore volume of about 0.12 cc/g, and a total micropore volume of about 0.13 cc/g. Comparative Sample D included about 5.5 wt. % bromide salt.

Each of the compositions from Example 2 is injected into a flue gas from an approximate 600 MW electric generating unit combusting a low rank coal (North Dakota lignite coal). In each case, the composition is injected upstream of an air heater unit and is extracted using a cold-side electrostatic precipitator. A GEMS measures mercury before composition injection and also in the stack to measure mercury removal efficacy of the compositions.

Figure 6:
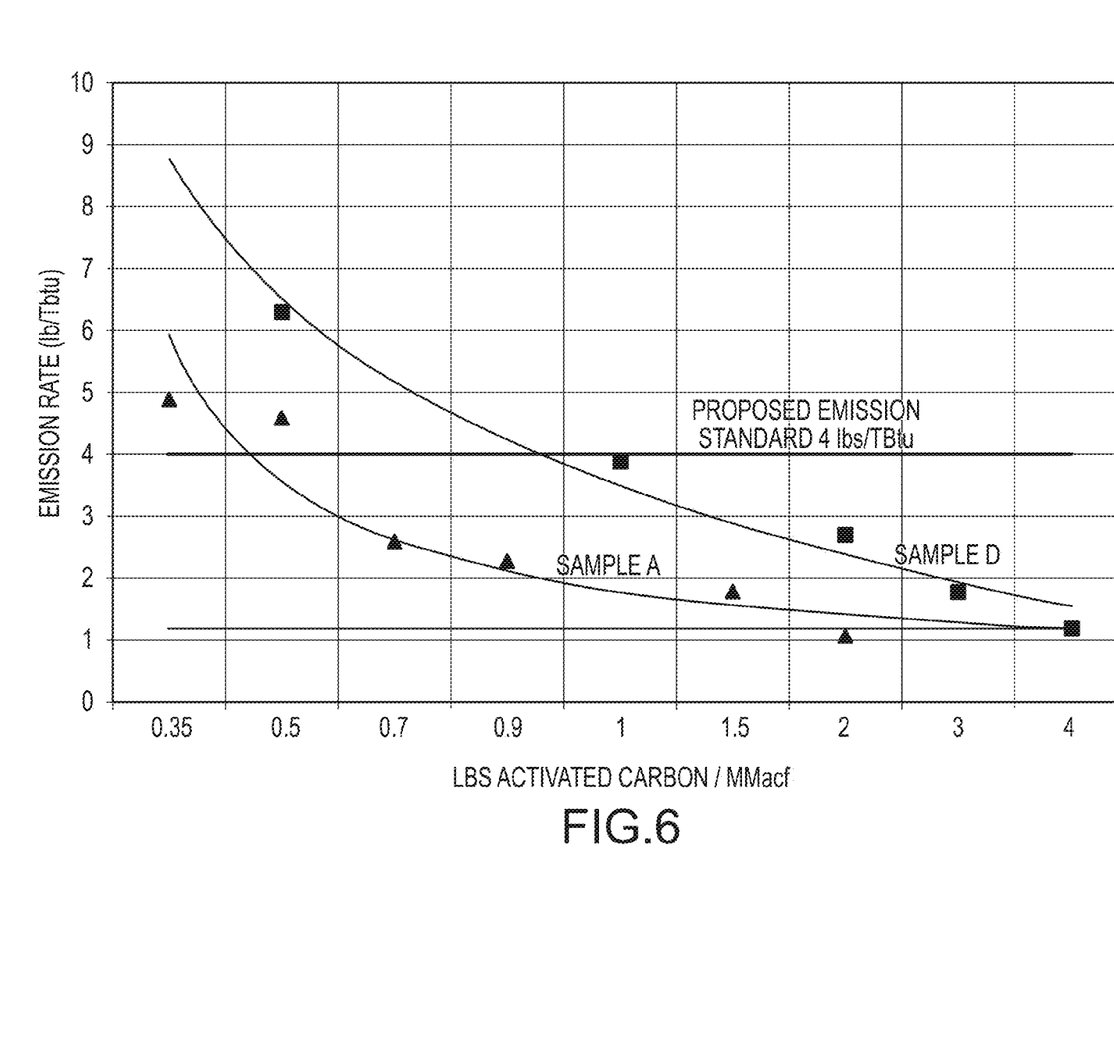
FIG. 6 presents mercury capture performance of an approximate 600 MW coal-fired power plant burning a low rank coal (North Dakota lignite coal) comparing a multi-functional composition of matter and a commercially available sorbent.

As illustrated in FIG. 6, which is a graph of mercury emission rates as a function of sorbent injection, Sample A achieves the US EPA MATS compliance limit for coal-fired power plants burning low rank coals (4 lbs Hg/Tbtu) at approximately over 60% less sorbent injected as compared to Sample D. In other words, Comparative Sample D required approximately more than about double the amount of Sample A to achieve the mercury compliance limit. In addition, Sample A has a slope of the trendline at the compliance limit of approximately −8, which is greater than about 2 times steeper than the slope for Comparative Sample D. Consequently, injection of additional amounts of multi-functional composition of matter at the compliance limit ultimately captures more mercury than comparable additional amounts of the currently available sorbent, and would allow the facility to capture more mercury than required by the regulatory limits.

While various embodiments of the present invention have been described in detail, it is apparent that modifications and adaptations of those embodiments will occur to those skilled in the art. However, is to be expressly understood that such modifications and adaptations are within the spirit and scope of the present invention.

What is claimed is:

1. A multi-functional composition of matter, comprising at least about 20 wt. % and not greater than about 75 wt. % fixed carbon, at least about 20 wt. % and not greater than about 50 wt. % minerals, at least about 1 wt. % and not greater than about 15 wt. % of a halogen, and at least about 3 wt. % and not greater than about 12 wt. % aqueous-based solubilizing medium, wherein:
the multi-functional composition of matter has a median particle size of not greater than about 15 micron;
the multi-functional composition of matter has a sum of micropore volume plus mesopore volume that is at least about 0.2 cc/g; and
the ratio of micropore volume to mesopore volume is at least about 0.7 and is not greater than about 1.5, and
wherein the minerals comprise at least about 1 wt. % iron-containing minerals.

2. The multi-functional composition of matter recited in claim 1, wherein when injected at a coal-fired power plant combusting high rank coal will result in emissions of mercury of less than 1.2 lbs/Tbtu at composition injection rates (in lbs/MMacf) of at least approximately 30% less as compared to a sorbent sold under the trademark PowerPac Premium, an activated carbon sorbent having a median particle size of about 25 micron, a fixed carbon content of about 50 wt. %, a mineral content of about 40 wt. %, a sum of micropore volume plus mesopore volume of about 0.25 cc/g, a total mesopore volume of about 0.13 cc/g, and a total micropore volume of about 0.12 cc/g, and including about 4.5 wt. % of a bromide salt, under comparable operating conditions.

3. The multi-functional composition of matter recited in claim 1, wherein when injected at a coal-fired power plant combusting high rank coal will result in emissions of mercury of less than 1.2 lbs/Tbtu at composition injection rates (in lbs/MMacf) of at least approximately 60% less as compared to a sorbent sold under the trademark PowerPac Premium, an activated carbon sorbent having a median particle size of about 25 micron, a fixed carbon content of about 50 wt. %, a mineral content of about 40 wt. %, a sum of micropore volume plus mesopore volume of about 0.25 cc/g, a total mesopore volume of about 0.13 cc/g, and a total micropore volume of about 0.12 cc/g, and including about 4.5 wt. % of a bromide salt, under comparable operating conditions.

4. The multi-functional composition of matter recited in claim 1, wherein when injected in a beta test at a coal-fired power plant combusting high rank coal and when the mercury emission rate (lb Hg/Tbtu) is plotted as a function of the composition injection rate (in lbs/MMacf), the slope of the curve with the highest $R^2$ value at 1.2 lbs Hg/Tbtu will be more negative than about −0.6.

5. The multi-functional composition of matter recited in claim 1, when injected in a beta test at a coal-fired power plant combusting high rank coal and when the mercury emission rate (lb Hg/Tbtu) is plotted as a function of the composition injection rate (in lbs/MMacf), the slope of the curve with the highest $R^2$ at 1.2 lbs Hg/Tbtu will be more negative than about −1.5.

6. The multi-functional composition of matter recited in claim 1, which when injected at a coal-fired power plant combusting low rank coal will result in emissions of mercury of less than 4.0 lbs/Tbtu at composition injection rates (in lbs/MMacf) of at least approximately 40% less as compared to a sorbent sold under the trademark PowerPAC Premium Plus, an activated carbon sorbent having a median particle size of about 25 micron, a fixed carbon content of about 50 wt. %, a native mineral content of about 40 wt. %, a sum of micropore volume plus mesopore volume of about 0.25 cc/g, a total mesopore volume of about 0.12 cc/g, and a total micropore volume of about 0.13 cc/g, and including about 5.5 wt. % of a bromide salt, under comparable operating conditions.

7. The multi-functional composition of matter recited in claim 1, wherein when injected at a coal-fired power plant combusting low rank coal will result in emissions of mercury of less than 4.0 lbs/Tbtu at composition injection rates (in lbs/MMacf) of at least approximately 50% less as compared to a sorbent sold under the trademark PowerPAC Premium Plus, an activated carbon sorbent having a median particle size of about 25 micron, a fixed carbon content of about 50 wt. %, a native mineral content of about 40 wt. %, a sum of micropore volume plus mesopore volume of about 0.25 cc/g, a total mesopore volume of about 0.12 cc/g, and a total micropore volume of about 0.13 cc/g, and including about 5.5 wt. % of a bromide salt, under comparable operating conditions.

8. The multi-functional composition of matter recited in claim 1, wherein when injected in a beta test at a coal-fired power plant combusting low rank coal and when the mercury emission rate (lb Hg/Tbtu) is plotted as a function of the composition injection rate (lbs matter/MMacf), the slope of the trendline with the highest $R^2$ value at 4.0 lbs Hg/Tbtu will be more negative than about −8.

9. The multi-functional composition of matter recited in claim 1, wherein the minerals are native to a feedstock for the manufacture of the multi-functional composition of matter.

10. The multi-functional composition of matter recited in claim 1, wherein the minerals are selected from the group consisting of calcium-containing minerals, potassium-containing minerals, iron-containing minerals, silicon-containing minerals, silicate-containing minerals, sodium-containing minerals, tin-containing minerals, zinc-containing minerals, magnesium-containing minerals, alumino-silicate containing minerals, and combinations thereof.

11. The multi-functional composition of matter recited in claim 1, wherein the minerals comprise oxide minerals.

12. The multi-functional composition of matter recited in claim 1, wherein the multi-functional composition of matter comprises at least about 3 wt. % and not greater than about 8 wt. % aqueous-based solubilizing medium.

13. The multi-functional composition of matter recited in claim 1, wherein the multi-functional composition of matter has a median particle size of not greater than about 12 micron.

14. The multi-functional composition of matter recited claim 1, wherein the multi-functional composition of matter has a median particle size of at least about 5 micron.

15. The multi-functional composition of matter recited in claim 1, wherein the multi-functional composition of matter has a Hardgrove Grindability Index of at least about 90.

16. The multi-functional composition of matter recited in claim 1, wherein the multi-functional composition of matter has a Hardgrove Grindability Index of at least about 100.

17. The multi-functional composition of matter as recited claim 1, wherein the multi-functional composition of matter has a mercury particle density of at least about 0.5 g/cc and not greater than about 0.9 g/cc.

18. The multi-functional composition of matter as recited claim 1, wherein the multi-functional composition of matter has an envelope particle density of at least about 0.3 g/mL and not greater than about 1.5 g/mL.

19. The multi-functional composition of matter recited in claim 1, wherein the multi-functional composition of matter has an envelope particle density of at least about 0.5 g/cc and not greater than about 1.0 g/cc.

20. The multi-functional composition of matter recited in claim 1, wherein the sum of micropore volume plus mesopore volume of the multi-functional composition of matter is at least about 0.25 cc/g.

21. The multi-functional composition of matter recited in claim 1, wherein:
the mesopore volume of the multi-functional composition of matter is at least about 0.10 cc/g and is not greater than about 0.15 cc/g;
the micropore volume of the multi-functional composition of matter is at least about 0.10 cc/g and is not greater than about 0.15 cc/g; and
the ratio of micropore volume to mesopore volume is greater than about 0.9 and less than about 1.5.

22. The multi-functional composition of matter recited in claim 1, wherein the pH of the multi-functional composition of matter is greater than about 8 and is less than about 12.

23. The multi-functional composition of matter recited in claim 1, wherein when the multi-functional composition of matter is analyzed by Scanning Electron Microscopy and Energy Dispersive Spectrometry at a magnification of 12,000 times over at least a 20 micron by 10 micron image area, the pixels attributed to the halogen exhibit a mean width of at least about 0.05 micron and not greater than about 2 micron, wherein the overall pixel area attributed to the halogen represents at least about 10% of the overall image area.

24. The multi-functional composition of matter recited in claim 1, wherein when the composition of matter is analyzed by Scanning Electron Microscopy and Energy Dispersive Spectrometry at a magnification of 12,000 times over at least a 20 micron by 15 micron image area, the pixels attributed to the halogen appear in at least 20% of the pixel area in any 10 micron by 10 micron scanning area.

25. The multi-functional composition of matter recited in claim 1, wherein when the halogen is in the form of a halide salt.

26. The multi-functional composition of matter recited in claim 1, wherein when the halogen is in the form of a bromide salt.

* * * * *